(12) United States Patent  
Kennedy

(10) Patent No.: US 8,466,570 B2
(45) Date of Patent: Jun. 18, 2013

(54) LOW PROFILE, SURFACE-MOUNTED POWER GENERATION SYSTEM

(75) Inventor: Eugene J. Kennedy, Philadelphia, PA (US)

(73) Assignee: Kinetic Energy Corporation, Washington, DC (US)

( * ) Notice: Subject to any disclaimer, the term of this patent is extended or adjusted under 35 U.S.C. 154(b) by 203 days.

(21) Appl. No.: 12/695,139

(22) Filed: Jan. 27, 2010
(Under 37 CFR 1.47)

(65) Prior Publication Data

US 2011/0084500 A1 Apr. 14, 2011

Related U.S. Application Data

(60) Provisional application No. 61/147,747, filed on Jan. 27, 2009, provisional application No. 61/147,748, filed on Jan. 27, 2009, provisional application No. 61/147,749, filed on Jan. 27, 2009, provisional application No. 61/147,750, filed on Jan. 27, 2009, provisional application No. 61/147,752, filed on Jan. 27, 2009, provisional application No. 61/147,754, filed on Jan. 27, 2009.

(51) Int. Cl.
*F02B 63/04* (2006.01)
*F03G 7/08* (2006.01)
*H02K 7/18* (2006.01)

(52) U.S. Cl.
USPC .................................... 290/1 R; 404/71

(58) Field of Classification Search
USPC .................... 290/1 R, 1 C; 404/71
See application file for complete search history.

(56) References Cited

U.S. PATENT DOCUMENTS

| 1,312,131 | A | 8/1919 | Morton |
| 1,771,200 | A | 7/1930 | Akers |
| 1,916,873 | A | 7/1933 | Wiggins |
| 3,748,443 | A | 7/1973 | Kroll et al. |
| 3,859,589 | A | 1/1975 | Rush |
| 3,885,163 | A | 5/1975 | Toberman |
| 3,918,844 | A | 11/1975 | Bailey |
| 3,944,855 | A | 3/1976 | Le Van |

(Continued)

FOREIGN PATENT DOCUMENTS

CH 1986/007504 A1 12/1986

OTHER PUBLICATIONS

Lee W. Young, International Search Report, PCT/US2009/066024 Apr. 2, 2010, p. 2, Alexandria, VA, US.

(Continued)

*Primary Examiner* — Hae Moon Hyeon
(74) *Attorney, Agent, or Firm* — Dresch IP Law, PLLC; John J. Dresch

(57) ABSTRACT

A low-profile, surface mount vehicle energy harvester including a low-profile, surface mount subunit having an upper surface forming a roadway surface; a vehicle activated treadle on the subunit, the vehicle activated treadle moveable between a first position in which an upper surface of the treadle is at an angle with respect to the upper surface of the roadway surface and a second position in which the upper surface of the treadle is flush with the upper surface of the roadway surface; a generator that generates power in response to movement of the vehicle activated treadle; and an entry ramp at a first end of the harvester roadway surface; and an exit ramp at a second end of the harvester roadway surface.

6 Claims, 3 Drawing Sheets

U.S. PATENT DOCUMENTS

| | | | |
|---|---|---|---|
| 4,004,422 A | | 1/1977 | Le Van |
| 4,081,224 A | | 3/1978 | Krupp |
| 4,115,034 A | | 9/1978 | Smith |
| 4,130,064 A | | 12/1978 | Bridwell |
| 4,211,078 A | | 7/1980 | Bass |
| 4,212,598 A | | 7/1980 | Roche et al. |
| 4,228,360 A | | 10/1980 | Navarro |
| 4,238,687 A | * | 12/1980 | Martinez ................. 290/1 R |
| 4,239,974 A | | 12/1980 | Swander et al. |
| 4,239,975 A | | 12/1980 | Chiappetti |
| 4,247,785 A | | 1/1981 | Apgar |
| 4,250,395 A | * | 2/1981 | Lundgren ................. 290/1 R |
| 4,322,673 A | | 3/1982 | Dukess |
| 4,339,920 A | | 7/1982 | Le Van |
| 4,409,489 A | | 10/1983 | Hayes |
| 4,418,542 A | | 12/1983 | Ferrell |
| 4,434,374 A | | 2/1984 | Lundgren |
| 4,437,015 A | | 3/1984 | Rosenblum |
| 4,614,875 A | | 9/1986 | McGee |
| 4,700,540 A | | 10/1987 | Byrum |
| 4,739,179 A | | 4/1988 | Stites |
| 4,912,995 A | | 4/1990 | Otters |
| 4,915,196 A | | 4/1990 | Krisko |
| 4,944,474 A | | 7/1990 | Jones |
| 4,980,572 A | | 12/1990 | Sen |
| 5,119,136 A | | 6/1992 | Morikawa |
| 5,157,922 A | | 10/1992 | Rosenberg |
| 5,250,769 A | | 10/1993 | Moore |
| 5,347,186 A | | 9/1994 | Konotchick |
| 5,355,674 A | | 10/1994 | Rosenberg |
| 5,449,909 A | | 9/1995 | Kaiser et al. |
| 5,634,774 A | | 6/1997 | Angel et al. |
| 5,648,645 A | | 7/1997 | Arpagaus et al. |
| 5,678,933 A | | 10/1997 | Ouchi et al. |
| 5,977,742 A | | 11/1999 | Henmi |
| 5,984,432 A | | 11/1999 | Otomo et al. |
| 6,023,134 A | | 2/2000 | Carl et al. |
| 6,091,159 A | | 7/2000 | Galich |
| 6,116,704 A | | 9/2000 | Nakakita et al. |
| 6,172,426 B1 | | 1/2001 | Galich |
| 6,204,568 B1 | | 3/2001 | Runner |
| 6,353,270 B1 | | 3/2002 | Sen |
| 6,362,534 B1 | | 3/2002 | Kaufman |
| 6,376,925 B1 | | 4/2002 | Galich |
| 6,467,266 B2 | | 10/2002 | Kanazawa et al. |
| 6,494,144 B1 | | 12/2002 | Perez Sanchez |
| 6,662,099 B2 | | 12/2003 | Knaian et al. |
| 6,718,760 B1 | | 4/2004 | Padera |
| 6,734,575 B2 | | 5/2004 | Ricketts |
| 6,756,694 B2 | | 6/2004 | Ricketts |
| 6,767,161 B1 | | 7/2004 | Calvo et al. |
| 6,812,588 B1 | | 11/2004 | Zadig |
| 6,858,952 B2 | | 2/2005 | Gott et al. |
| 6,894,233 B2 | | 5/2005 | Dingwall et al. |
| 6,936,932 B2 | | 8/2005 | Kenney |
| 6,969,213 B2 | | 11/2005 | Rastegar et al. |
| 7,043,904 B2 | | 5/2006 | Newman |
| 7,067,932 B1 | | 6/2006 | Ghassemi |
| 7,102,244 B2 | | 9/2006 | Hunter, Jr. |
| 7,145,257 B2 | | 12/2006 | Ricketts |
| 7,148,581 B2 | | 12/2006 | Hershey et al. |
| 7,239,031 B2 | | 7/2007 | Ricketts |
| 7,315,088 B2 | | 1/2008 | Erriu |
| 7,371,030 B2 | | 5/2008 | Hickman |
| 7,429,145 B2 | * | 9/2008 | Rastegar et al. ................. 404/71 |
| 7,629,698 B2 | * | 12/2009 | Horianopoulos et al. .... 290/1 R |
| 2003/0132636 A1 | | 7/2003 | Ricketts |
| 2003/0151381 A1 | | 8/2003 | Kadota et al. |
| 2004/0066041 A1 | | 4/2004 | Hunter, Jr. |
| 2005/0116545 A1 | | 6/2005 | Hamel et al. |
| 2005/0143876 A1 | | 6/2005 | Tanase |
| 2005/0200132 A1 | | 9/2005 | Kenney |
| 2006/0152008 A1 | | 7/2006 | Ghassemi |
| 2006/0237968 A1 | | 10/2006 | Chandrasekaran |
| 2007/0018803 A1 | | 1/2007 | Lang |
| 2007/0085342 A1 | | 4/2007 | Horianopoulos et al. |
| 2007/0158945 A1 | | 7/2007 | Annen et al. |
| 2008/0224477 A1 | | 9/2008 | Kenney |

OTHER PUBLICATIONS

Blaine R. Copenheaver, International Search Report, PCT/US2009/066025 Mar. 10, 2010, p. 2, Alexandria, VA, US.

Lee W. Young, International Search Report, PCT/US2010/022287 Jun. 1, 2010, p. 2, Alexandria, VA, US.

Blaine R. Copenheaver, International Search Report, PCT/US2010/022288 Jul. 12, 2010, p. 2, Alexandria, VA, US.

Lee W. Young, International Search Report, PCT/US2010/022289 Jun. 1, 2010, p. 2, Alexandria, VA, US.

Lee W. Young, International Search Report, PCT/US2010/022291 Jun. 15, 2010, p. 2, Alexandria, VA, US.

Blaine R. Copenheaver, International Search Report, PCT/US20101022294 Jun. 28, 2010, p. 2, Alexandria, VA, US.

Blaine R. Copenheaver, International Search Report, PCT/US2010/022296 Jul. 29, 2010, p. 2, Alexandria, VA, US.

Lee W. Young, International Search Report, PCT/US2010/020676 Jun. 15, 2010, p. 2, Alexandria, VA, US.

* cited by examiner

LOW PROFILE, SURFACE-MOUNTED POWER GENERATION SYSTEM

CROSS-REFERENCE TO RELATED APPLICATIONS

The present invention claims the benefit of U.S. Provisional Patent Application No. 61/147,747, filed Jan. 27, 2009, and entitled "TRANSIENT ABSORBER FOR POWER GENERATION SYSTEM", U.S. Provisional Patent Application No. 61/147,748, filed Jan. 27, 2009, and entitled "WEATHER RESPONSIVE TREADLE LOCKING MEANS FOR POWER GENERATION SYSTEM", U.S. Provisional Patent Application No. 61/147,749, filed Jan. 27, 2009, and entitled "LOW PROFILE, SURFACE-MOUNTED POWER GENERATION SYSTEM", U.S. Provisional Patent Application No. 61/147,750, filed Jan. 27, 2009, and entitled "VEHICLE SPEED DETECTION MEANS FOR POWER GENERATION SYSTEM", U.S. Provisional Patent Application No. 61/147,752, filed Jan. 27, 2009, and entitled "RECIPROCAL SPRING ARRANGEMENT FOR POWER GENERATION SYSTEM", and U.S. Provisional Patent Application No. 61/147,754, filed Jan. 27, 2009, and entitled "LOSSLESS SHORT-DURATION ELECTRICAL STORAGE MEANS FOR POWER GENERATION SYSTEM", the entire contents of which are incorporated herein by reference in their entirety.

FIELD OF THE INVENTION

The present invention is directed toward devices and methods of harvesting vehicle energy, and more specifically, toward a Low Profile, Surface-Mounted Power Generation System for harvesting vehicle energy.

BACKGROUND OF THE INVENTION

Very few devices that capture energy from passing vehicles have been implemented, despite numerous designs put forth by various parties over the years. Issues of efficiency, reliability, and manufacturability, among others, have limited the practicality of vehicle energy harvesting devices. Added to the challenge is the variability of vehicle sizes, speeds, axle configurations, and lane positions, all of which can greatly influence the operation of a device trying to capture the motion energy of vehicles and convert it into a useful form of energy.

Therefore, a need exists for an energy capture device and method having improved efficiency, reliability, and manufacturability, as well as practicality. A need also exists for an energy capture device and method that takes into account the variability of vehicle sizes, speeds, axle configurations, and lane positions in converting the captured motion energy of vehicles into a useful form of energy.

SUMMARY OF THE INVENTION

These problems and others are addressed by the present invention, which provides a novel vehicle energy harvester that overcomes many of the issues with the conventional devices and is therefore better suited for real-world implementation than the conventional devices.

The exemplary embodiments of the invention make productive use of the energy that is normally wasted (in the form of heat) in reducing the speed of motor vehicles on exit ramps, toll plazas etc., etc. The vehicle energy harvester can absorb mechanical energy from passing (or breaking) vehicles and convert the mechanical energy to electrical energy using, for example, shaft driven generators.

The disclosed embodiments provide a vehicle energy harvester and power generation system that is simple to install, provides a short payback period, and has a scalable configuration. More particularly, the disclosed embodiments can provide a simple and reliable mechanical configuration that can withstand sever environments. The low cost configuration of the system may provide for faster payback of the expense of the system, and therefore, make the system more practical and desirable for practical applications.

Additionally, the ease with which the system can be installed also may make the system more practical and desirable for practical applications. The disclosed embodiments require little or no excavation and can be installed in a few hours, instead of over several days as with conventional devices.

The disclosed embodiment also can provide a scalable configuration that may be particularly advantageous for use at locations, such as exits ramps, toll plazas, hills, among other locations.

The exemplary embodiments provide a low profile unit mounted directly on top of the existing roadway. In addition to this, other conventional devices do not have a means for determining the speed of oncoming vehicles. The disclosed embodiments provide important advantages in that vehicles traveling faster than the posted speed limit can be slowed by the vehicle energy harvester unit and a portion of the vehicle's kinetic energy can be converted to electricity rather than wasted as heat from the vehicles braking system. Conversely, vehicles traveling at or below the posted speed limit can be allowed to pass unimpeded.

An exemplary embodiment of the invention is directed to, for example, a low-profile, surface mount vehicle energy harvester including a low-profile, surface mount subunit having an upper surface forming a roadway surface, a vehicle activated treadle on the subunit, the vehicle activated treadle moveable between a first position in which an upper surface of the treadle is at an angle with respect to the upper surface of the roadway surface and a second position in which the upper surface of the treadle is flush with the upper surface of the roadway surface, a generator that generates power in response to movement of the vehicle activated treadle, an entry ramp at a first end of the harvester roadway surface, and an exit ramp at a second end of the harvester roadway surface.

Another exemplary embodiment of the invention is directed to, for example, a vehicle energy harvester comprising a plurality of subunits each having an upper surface forming a roadway surface, a vehicle activated treadle on at least one of the plurality of subunits, the vehicle activated treadle moveable between a first position in which an upper surface of the treadle is at an angle with respect to the upper surface of the roadway surface and a second position in which the upper surface of the treadle is flush with the upper surface of the roadway surface, a generator that generates power in response to movement of the vehicle activated treadle, an entry ramp at a first end of the harvester roadway surface, and an exit ramp at a second end of the harvester roadway surface.

BRIEF DESCRIPTION OF THE DRAWINGS

These and other aspects and features of embodiments of the present invention will be better understood after a reading of the following detailed description, together with the attached drawings, wherein.

DETAILED DESCRIPTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
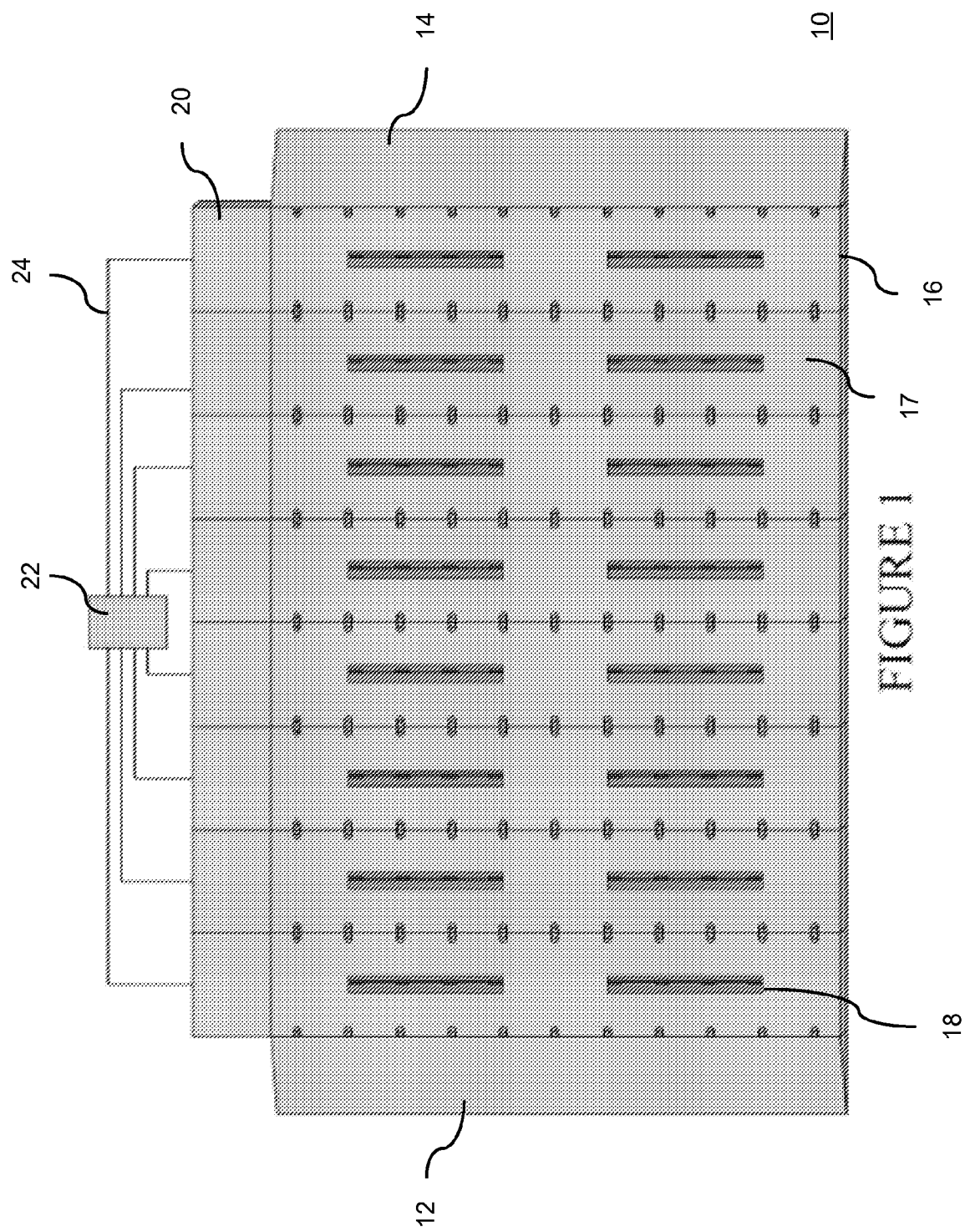
FIG. 1 is a schematic top view of a power absorber unit of a vehicle energy harvester.
Figure 2:
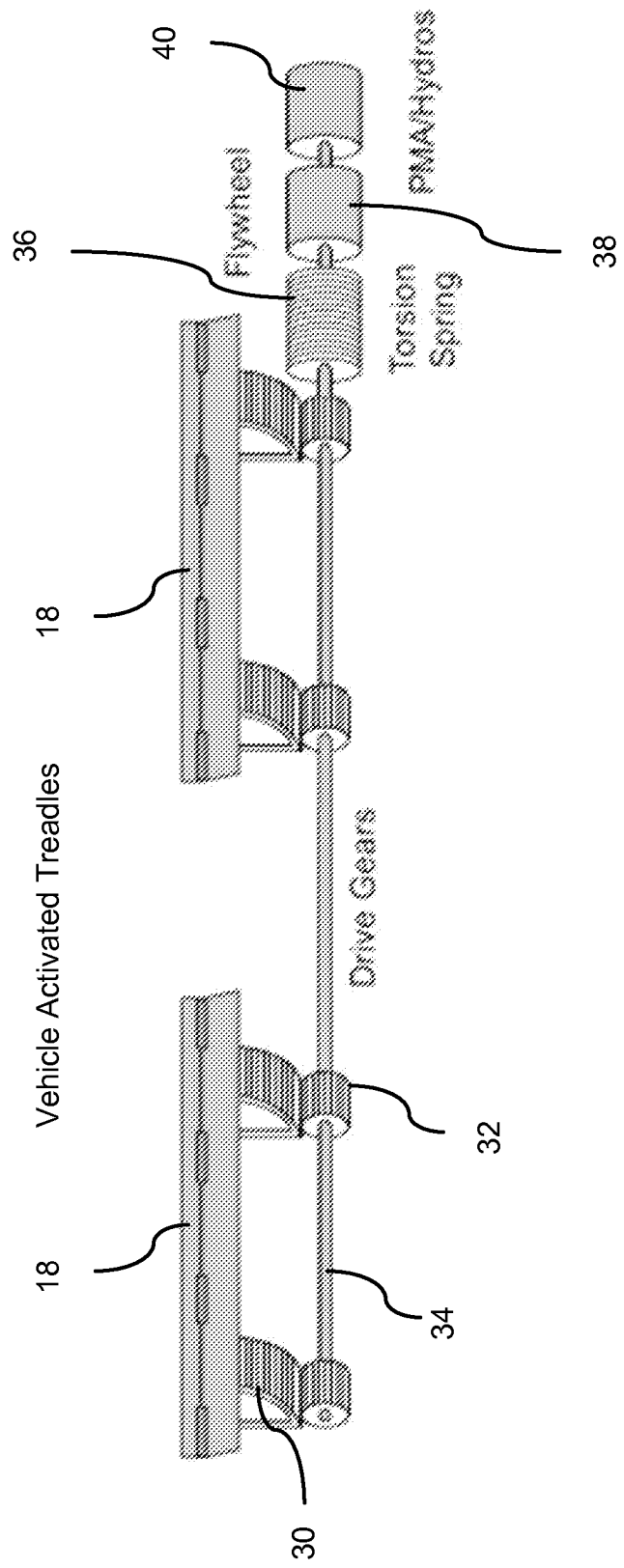
FIG. 2 is a schematic perspective view illustrating a portion of a vehicle energy harvester.
Figure 3:
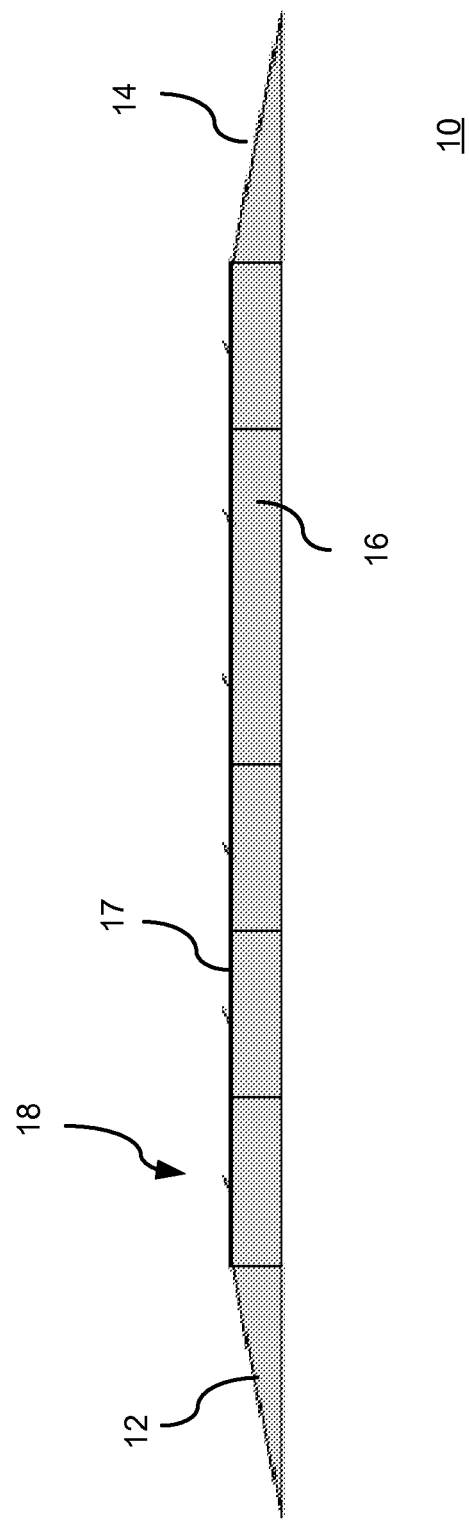
FIG. 3 is a schematic top view of a low-profile, surface mount vehicle energy harvester.

Referring now to the drawings, FIGS. 1-3 illustrate an exemplary vehicle energy harvester 10.

The exemplary embodiments can make productive use of the energy that is normally wasted (in the form of heat) in reducing the speed of motor vehicles on exit ramps, toll plazas etc., etc. The vehicle energy harvester 10 can absorb mechanical energy from passing (or breaking) vehicles and convert the mechanical energy to electrical energy using, for example, shaft driven generators. Other means for converting the mechanical energy to electrical energy also are contemplated. In an exemplary embodiment, the electric power from the generators can be converted, metered, and fed into the commercial power grid. In another exemplary aspect, each site can be equipped with wireless communications to monitor the status and/or output of the system.

Power Absorber Configuration

The disclosed embodiments can include individual assemblies with integral generators. Other generator configurations also are possible, such as separate generators.

As shown in FIG. 1, the vehicle energy harvester unit 10 can be a low-profile surface mounted assembly. The vehicle energy harvester unit 10 can include an entry ramp 12 and an exit ramp 14. The vehicle energy harvester unit 10 can include a plurality of subunits 16 having a top surface or driving surface 17. Each subunit can include one or more vehicle activated treadles 18. In an embodiment, each subunit 16 can include a generator unit 20.

In other embodiments, the vehicle energy harvester unit 10 can be set into the road surface. The surface mounted assembly may require minimal installation effort. Additionally, the unit count can be scaled to road/breaking needs. In an embodiment, each generator unit 20 can feed a common power summing/conversion unit 22. A simple cable interconnect 24 can be provided to connect each generator unit 20 to the common power summing/conversion unit 22. A fail safe configuration can protect the system against individual unit failures.

Power Conversion Unit

In a disclosed embodiment, the individual absorber units 16 can be connected via cable assemblies 24. The input power can be summed and applied to a low-loss inverter unit. The power can be converted immediately to a form that is transmittable to the power grid. The output can be metered and applied to the power grid for transmission.

Absorber Unit Operation

With reference to FIG. 2, an exemplary embodiment of a subunit 16 of a vehicle energy harvester unit 10 can include spring-loaded treadles 18 having a treadles gear 30 engaging a drive gear 32. The drive gear 32 is coupled to a shaft 34. In operation, one or more vehicle tires force the spring-loaded treadles 18 down as they roll over the treadles 18. The treadle gears 30 drive the plurality of drive gears 32, which rotate the shaft 34. The shaft 34 winds a torsion spring 36, thereby absorbing the treadle drive transient. A pawl can lock the shaft 34 as rotation ends. The torsion spring 36 rotates a flywheel 38, thereby spreading the impulse of the treadle drive over time to extend output to a generator 40. The flywheel 38 can turn a generator 40, such as a hydro pump. The generator 40, in turn, can generate electric power for sale/use/storage.

The exemplary embodiments improve the durability of the system under practical use scenarios.

Conventional devices generally require a large installation effort that may include roadbed excavation (and attendant construction) or other significant modifications to the road surface. The exemplary embodiments provide a low profile vehicle energy harvester unit 10 mounted directly on top of the existing roadway. In addition to this, other conventional devices do not have a means for determining the speed of oncoming vehicles. The speed of oncoming vehicles is beneficial such that vehicles traveling faster than the posted speed limit can be slowed by the vehicle energy harvester unit and a portion of the vehicle's kinetic energy is converted to electricity rather than wasted as heat from the vehicles braking system. Conversely, vehicles traveling at or below the posted speed limit will be allowed to pass unimpeded. These improvements are discussed below.

Low Profile, Surface-Mounted Design

With reference to FIGS. 1-3, an exemplary embodiment of a low-profile, surface mount vehicle energy harvester unit 10 will now be described.

An exemplary embodiment provides a vehicle energy harvester unit 10 that is designed as a low-profile assembly that can be mounted directly atop existing roadways with little or no modifications to the roadway. This configuration provides practical benefits with respect to installation and maintenance. It also may provide a significant cost advantage as compared to other approaches requiring elaborate installation/construction efforts. The embodiments of the exemplary vehicle energy harvester units 10 can be installed in a matter of hours vs. days. Likewise, maintenance can be greatly improved whereby defective components can be replaced quickly and easily without any major construction work and accompanying delays to traffic. A preferred component used in achieving this configuration is a custom designed permanent magnet alternator that has, for example, a cylindrical form factor approximately 4 inches in diameter and 2 inches in height. The overall operation of the vehicle energy harvester unit 10 is shown in FIGS. 1-3.

The vehicle energy harvester unit 10 can include a modular construction having a plurality of subunits 16, thereby providing a simple and easy installation and maintenance of the vehicle energy harvester unit 10. The modular construction of the plurality of subunits 16 can enable a scalable configuration such that the vehicle energy harvester unit 10 can be configured for various applications, space requirements, desired power generation, etc.

In an exemplary embodiment, a height of each of the subunits 16 preferably is limited to less than or equal to three (3) inches. However, other heights are possible, for example, for entry ramps 12 and exit ramps 14 having a variety of slopes and lengths.

A length and slope of the entry ramps 12 and exit ramps 14 can be selected based on the height of the subunits 16 and the particular application of the vehicle energy harvester unit 10. For example, the length of the entry ramp 12 and/or the exit ramp 14 can be increased, thereby reducing the slope of the entry ramp 12 and/or the exit ramp 14 for a given height of the subunits 16 and minimizing the impact on the vehicle energy harvester unit 10 by a vehicle, as well as minimizing a discomfort the user of the vehicle driving over the vehicle energy harvester unit 10. The vehicle energy harvester unit 10 has a simplified arrangement that provides ample space and adaptability for structural reinforcement.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

What is claimed is:

1. A low-profile, surface mount vehicle energy harvester comprising:
   a low-profile, surface mount subunit having an upper surface forming a roadway surface;
   a vehicle activated treadle on the subunit, the vehicle activated treadle moveable between a first position in which an upper surface of the treadle is at an angle with respect to the upper surface of the roadway surface and a second position in which the upper surface of the treadle is flush with the upper surface of the roadway surface;
   a generator that generates power in response to movement of the vehicle activated treadle;
   a drive gear mounted on a rotatable shaft, the drive gear being driven by movement of the vehicle activated treadle, and wherein the rotatable shaft is coupled to the generator;
   an absorption device coupled between the drive gear and the generator;
   an entry ramp at a first end of the harvester roadway surface; and
   an exit ramp at a second end of the harvester roadway surface.

2. The vehicle energy harvester of claim 1, wherein a height of the low-profile, surface mount subunit is one of equal to and less than three inches.

3. The vehicle energy harvester of claim 1, comprising:
   a treadle gear coupled to the vehicle activated treadle the drive gear engaging and being driven by movement of the treadle gear.

4. The vehicle energy harvester of claim 1, wherein the absorption device is a torsion spring.

5. The vehicle energy harvester of claim 1, comprising:
   a flywheel coupled between the absorption device and the generator.

6. A vehicle energy harvester comprising:
   a plurality of subunits each having an upper surface forming a roadway surface;
   a vehicle activated treadle on at least one of the plurality of subunits, the vehicle activated treadle moveable between a first position in which an upper surface of the treadle is at an angle with respect to the upper surface of the roadway surface and a second position in which the upper surface of the treadle is flush with the upper surface of the roadway surface;
   a generator that generates power in response to movement of the vehicle activated treadle;
   a drive gear mounted on a rotatable shaft, the drive gear being driven by movement of the vehicle activated treadle, and wherein the rotatable shaft is coupled to the generator;
   an absorption device coupled between the drive gear and the generator;
   an entry ramp at a first end of the harvester roadway surface; and
   an exit ramp at a second end of the harvester roadway surface.

* * * * *